G. X. WITTMER.
APPARATUS FOR TURNING BOLTS, SCREWS, &c.
APPLICATION FILED MAR. 13, 1908.
918,632.
Patented Apr. 20, 1909.
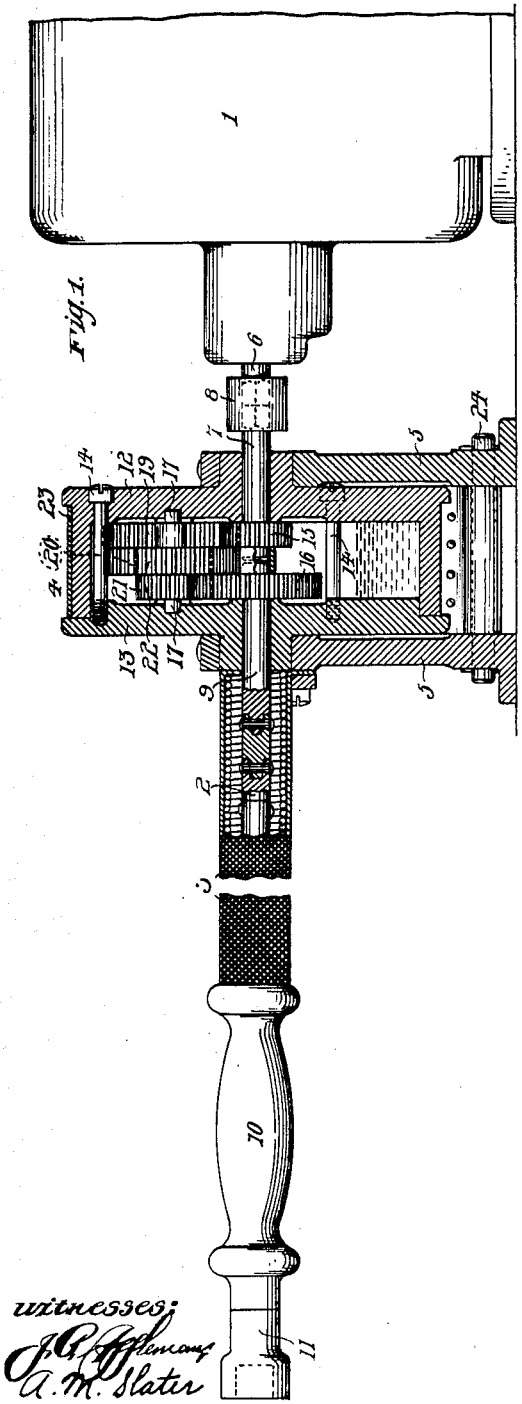
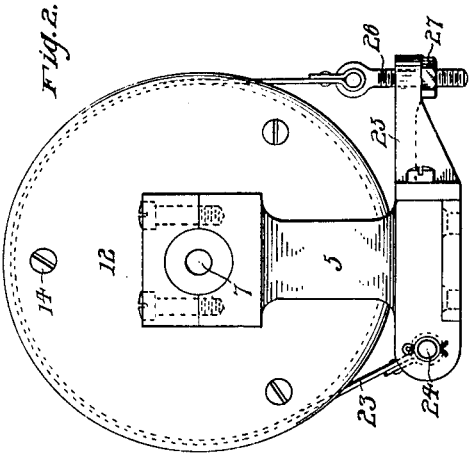
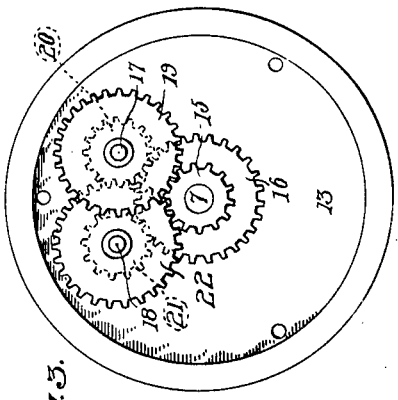
Witnesses:
Inventor
George X. Wittmer
by W. C. Doolittle
Attorney.

UNITED STATES PATENT OFFICE.

GEORGE X. WITTMER, OF PITTSBURG, PENNSYLVANIA.

APPARATUS FOR TURNING BOLTS, SCREWS, &c.

No. 918,632.  Specification of Letters Patent.  Patented April 20, 1909.

Application filed March 13, 1908. Serial No. 420,818.

*To all whom it may concern:*

Be it known that I, GEORGE X. WITTMER, of Pittsburg, in the county of Allegheny and State of Pennsylvania, have invented certain new and useful Improvements in Apparatus for Turning Bolts, Screws, &c., of which the following is a specification.

An object of my invention is to provide an apparatus for turning threaded-bolts, screws, or other threaded parts; also, for turning nuts or bolts and for similar purposes.

A further object of my invention is to provide an apparatus to be used for the above specified and other similar purposes, of such construction, that the rotary or turning movement imparted to the bolt, screw, nut, or other object, will be automatically freed from the driving action of the motor and stopped when a predetermined resistance or pressure is encountered. By providing means for automatically stopping the rotary movement of the object being turned upon encountering a certain resistance, I eliminate the danger of forcing the head off the bolt or injuring the threaded portion of the part or object being turned into the desired position.

In the accompanying drawing, which illustrates the preferred embodiment of my invention, Figure 1 is a part side elevational and a part vertical sectional view of an apparatus constructed in accordance with my invention; Fig. 2 an end elevational view of a portion of the apparatus; and Fig. 3 a detail view particularly showing the differential gearing employed.

Referring to the drawing, 1 designates an electric-motor, and 2 a flexible rotary shaft inclosed in a suitable casing 3. Interposed between the motor and the flexible shaft, I employ a differential gear mechanism 4 mounted in a housing 5. As illustrated, the motor-shaft 6 is connected with a shaft 7 of the gear mechanism by means of a coupling-member 8, and the flexible-shaft with a second gear-shaft 9, which latter is in axial alinement with gear-shaft 7. Secured to the outer end of the flexible rotary shaft casing I employ handle 10 and a suitable holder 11.

It is obvious that in place of an electric-motor another form of motor may be employed in connection with the differential gear mechanism and also that instead of connecting the holder to a flexible shaft, it may be secured to and operated by a non-flexible rotary shaft.

An important part of the apparatus shown for effecting the turning of the threaded part and the stoppage thereof, when a predetermined resistance or pressure is encountered, is the differential gear mechanism. This mechanism, in addition to the alined shafts 7 and 9 above referred to, comprises, a casing or hollow-member which preferably consists of two parts 12 and 13 secured together by bolts 14 and the gearing proper. The casing is mounted in the housing and is adapted to revolve therein as hereinafter described. The gearing proper consists, of a small drive gear-wheel 15 carried on and adapted to revolve with shaft 7, a larger driven gear-wheel 16 mounted on gear-shaft 9, and two sets of gears each respectively loosely mounted on spindles 17 and 18 which latter are supported by the casing. The gears carried upon spindle 17 and which are arranged to revolve together comprise a large gear-wheel 19 and a small gear 20. The diameter of wheel 19 corresponds with the diameter of wheel 16; and the diameter of gear-wheel 20 with that of the drive gear-wheel 15. The gears on spindle 18, which are also designed to revolve together and are loosely mounted on said spindle, comprise a small gear 21, and a large gear 22. The size of the small gear 21 is the same as the other small gears 15 and 20, and the diameter of wheel 22 is the same as that of wheels 16 and 19. As shown, the small drive-gear 15 meshes with the large wheel 19, the large driven-gear 16 with the small gear-wheel 21, and the large wheel 22 with the small wheel 20. The arrangement of the gearing, as illustrated, is designed to reduce the speed of the rotary flexible shaft to about one-eighth of that of the motor-shaft.

By means of the rotatable gear casing in which the gears 19, 20, 21 and 22 are mounted loosely, these gears are capable of a planetary movement around the driving shaft of the holder so as to carry with them the rotatable gear casing. When these intermediate gears are given such movement from the driving shaft, the driven shaft and its holder will be permitted to remain stationary. To prevent the rotation of the gear casing normally so that a direct driving action is given through the differential gears to the holder shaft, a band brake 23 having an adjustable resistance is arranged in frictional contact with the gear casing. This band 23 is located on the outside of the casing and extends partly around it and has one end fixedly secured to the housing by a rod 24 extending across the housing and located in openings formed therein. The other end of the band is adjustably secured to the housing, or to projections 25 thereof. To tighten and loosen the belt on the gear-casing, I preferably employ threaded bolt 26 and nut 27. The tension of the band is regulated by means of the adjusting-nut and the band may be adjusted relatively to the gear-casing in such a manner as to permit the said casing to revolve when a predetermined resistance or pressure is encountered by the holder containing the threaded part that is being driven into the desired position. When the resistance to the holder above mentioned is met with the power of the driving shaft will be exerted to drive the gears of the gear casing in a planetary movement around the holder shaft and the resistance of the band brake being overcome, the gear-casing will be actuated by the gearing instead of the flexible rotary shaft and said casing revolved and the rotary movement of the flexible shaft and its holder transferred to the planetary movement of the gear casing and the flexible shaft in its holder thus freed from the driving action of the motor.

What I claim is:

1. An apparatus for turning a threaded part comprising a holder for the part to be turned, a driven shaft therefor, a separate driving shaft, a separate rotary member, gearing engaging said driving and driven shafts and said rotary member, means whereby the driving action of the driving shaft is automatically shifted from the holder to the rotary member when the holder encounters a predetermined resistance, substantially as described.

2. An apparatus for turning a threaded part comprising a holder for the part to be turned, a driven shaft carrying the same, a separate driving shaft, gears intermediate said shafts, a rotary member to which the driving action of the second shaft is automatically transferred when the holder meets a predetermined resistance and a resistance member normally tending to keep said rotary member from actuation by the driving shaft, substantially as described.

3. An apparatus for turning a threaded part comprising a holder for the article to be turned, a driven shaft carrying said holder, a separate driving shaft, gears on the shafts, intermediate loose gears joining the shaft gears, a rotatable body in which said intermediate gears are mounted, and a brake for said rotatable body to hold the same normally from rotation, said intermediate gears adapted to be positively connected to said rotatable body and to drive the same when the resistance of the brake is overcome substantially as described.

4. An apparatus for turning a threaded part having means for automatically stopping the rotary movement of the part when a predetermined resistance is encountered comprising a gearing, a rotatable gear-casing, and a band-brake adjusted to automatically permit the gear casing to revolve when the resistance offered the threaded part exceeds the resistance of the brake on the gear casing, substantially as described.

5. An apparatus for turning a threaded part, comprising a holder for the article to be turned, a driven shaft carrying said holder, a separate driving shaft, gears on the shafts, intermediate gears capable of a planetary movement with respect to the driven shaft gear, and resistance means for normally preventing the said planetary movement, said resistance means adapted to be automatically overcome when the holder meets a predetermined resistance in turning the threaded part, substantially as described.

6. An apparatus for turning a threaded part comprising a holder for the part to be turned, a driven shaft therefor, a separate driving shaft, gears on said shafts, a set of intermediate gears between and connecting said shaft gears, a rotatable gear casing on which the intermediate gears are loosely mounted, a brake band adapted to engage the gear casing to prevent its rotation and to hold the intermediate gears in connecting engagement with the shaft gears and adapted to be automatically overcome in resistance by the resistance met by the holder, whereby the gear casing will be rotated around the driven shaft by the driving shaft, substantially as described.

In testimony whereof I affix my signature in presence of two witnesses.

GEORGE X. WITTMER.

Witnesses:
EDWIN L. ALLEN,
W. G. DOOLITTLE.